United States Patent
Eterovic Alliende et al.

(10) Patent No.: US 11,647,049 B2
(45) Date of Patent: May 9, 2023

(54) DYNAMIC APPLICATION SECURITY POSTURE CHANGE BASED ON PHYSICAL VULNERABILITY

(71) Applicant: Google LLC, Mountain View, CA (US)

(72) Inventors: Jose Tomas Eterovic Alliende, Sunnyvale, CA (US); Paul Pescitelli, Atlanta, GA (US)

(73) Assignee: Google LLC, Mountain View, CA (US)

( * ) Notice: Subject to any disclaimer, the term of this patent is extended or adjusted under 35 U.S.C. 154(b) by 104 days.

(21) Appl. No.: 16/847,732

(22) Filed: Apr. 14, 2020

(65) Prior Publication Data
US 2021/0320948 A1    Oct. 14, 2021

(51) Int. Cl.
*H04L 9/40* (2022.01)
(52) U.S. Cl.
CPC .................... *H04L 63/20* (2013.01)
(58) Field of Classification Search
None
See application file for complete search history.

(56) References Cited

U.S. PATENT DOCUMENTS

| | | | |
|---|---|---|---|
| 7,289,334 B2 | 10/2007 | Behrens et al. | |
| 8,528,101 B1* | 9/2013 | Miller | G06F 21/55 726/26 |
| 10,121,026 B1* | 11/2018 | Ryland | H05K 7/1414 |
| 2009/0293136 A1* | 11/2009 | Campbell | G08B 13/19 726/34 |
| 2014/0088979 A1* | 3/2014 | Garman | G06F 21/86 705/1.1 |
| 2017/0111451 A1 | 4/2017 | Thul | |

OTHER PUBLICATIONS

International Search Report and Written Opinion for International Application No. PCT/US2020/057465 dated Jan. 26, 2021. 15 pages.
"Data Center Security Monitoring and Access Control." Netmon, Inc. Ó2018. Retrieved from the Internet: <https://www.netmon.com/data-center-security-access-monitoring/>. 9 pages.
"Data Centers—Our Controls." Amazon Web Services, Inc. © 2020. Retrieved from the Internet: <https://aws.amazon.com/compliance/data-center/controls/>. 9 pages.

(Continued)

*Primary Examiner* — Cai Y Chen
(74) *Attorney, Agent, or Firm* — Lerner David LLP

(57) ABSTRACT

A system is provided for protecting services, such as cloud services, running on one or more server computers in a server rack. The system includes one or more rack processors. The one or more rack processors may receive sensor signals from one or more sensors of the server rack, the sensor signals capturing a physical environment of the server rack in a datacenter. The one or more rack processors may determine, based on the sensor signals, a security status of the server rack. The one or more rack processors may send the security status to the services on the one or more server computers within the server rack.

19 Claims, 8 Drawing Sheets

(56) References Cited

OTHER PUBLICATIONS

"HP security technology for racks and power." Technology Brief. Hewlett-Packard Development Company, L.P. © 2003. Retrieved from the Internet: <http://h10032.www1.hp.com/ctg/Manual/c00257501.pdf>. 7 pages.

Cowan, Christian and Chris Gaskins. "Monitoring Physical Threats in the Data Center." © 2011. White Paper 102, Revision 3. Schneider Electric—Data Center Science Center. Retrieved from the Internet: <https://download.schneider-electric.com/files?p_Doc_Ref=SPD_JMON-5ZLP8M_EN>. pp. 1-13.

Spatig, Steve. "Securing the Physical Safety of Data with Rack-Level Access Control." Feb. 13, 2018. Security Today. Retrieved from the Internet: <https://securitytoday.com/blogs/reaction/2018/02/Securing-the-Physical-Safety-of-Data-with-Rack-Level-Access-Control.aspx>. 12 pages.

International Preliminary Report on Patentability for International Application No. PCT/US2020/057465 dated Oct. 27, 2022. 9 pages.

\* cited by examiner

| Signal | Ethernet Door Module |
| --- | --- |
| Door Position Sense (Front/Rear) | Input 1 |
| Door Mesh Tamper (Front/Rear) | Input 2 |
| Badge Reader Tamper (Front/Rear) | Input 2 |
| Lock Handle Closed/Release (Front/Rear) | Input 3 |
| Electronic lock engaged/retracted (Front/Rear) | Input 4 |
| Door Control | output1 |
| LED | output2 |
| Buzzer | output2 |
| K-Form Relay | output2 |

DYNAMIC APPLICATION SECURITY POSTURE CHANGE BASED ON PHYSICAL VULNERABILITY

BACKGROUND

In a datacenter, server computers are typically arranged in racks. Such server computers may be configured to provide various services, such as cloud services, in a distributed manner, for example workloads for an application may be run by one or more clusters of server computers in the datacenter. To protect the server computers, each rack may be positioned inside an enclosure, or the rack itself may serve as the enclosure. The enclosure may include one or more doors that allow entry or access when needed, for example such as for maintenance, and one or more locks to secure the doors at all other times. For example, the locks may be mechanical locks that can be opened with physical keys, or may be electronic locks that can be opened with pin codes, badges, biometric authentication, or other authentication mechanisms. The datacenter and the enclosures may also include additional security measures, such as security cameras, touch or optical sensors on the enclosures, alarms, buzzers, lights, etc., which may prevent some unauthorized entries. However, if an unauthorized entry is nonetheless made by an intruder, it may be too late to prevent damage. For instance, although security personnel may be notified of the intrusion, the server computers within the server enclosure still have no knowledge of the intrusion, and may continue to run applications as usual. Thus the intruder may be able to access sensitive applications and/or data in the server computers before the security personnel responds to the intrusion.

BRIEF SUMMARY

The present disclosure provides for receiving, by one or more rack processors, sensor signals from one or more sensors of a server rack, wherein the sensor signals capture a physical environment of the server rack in a datacenter, and wherein the server rack includes one or more server computers configured to provide one or more cloud services; determining, by the one or more rack processors based on the sensor signals, a security status of the server rack; and sending, by the one or more rack processors, the security status to the one or more cloud services on the one or more server computers within the server rack.

Capturing the physical environment may include detecting at least one of: positioning of a door or other components of the server rack, contacts made with any part of the server rack, tampering with the server rack, motions of objects or persons inside the server rack.

The method may further comprise receiving, by the one or more rack processors, maintenance information for the server rack, wherein the security status is further determined based on the maintenance information. The maintenance information may include at least one of: a maintenance request, a scheduled time for maintenance, an authorized personnel to perform the maintenance, an identity of a given server computer to be serviced within the server rack.

The method may further comprise detecting, by the one or more rack processors based on the sensor signals, an unauthorized entry to the server rack, wherein the security status indicates that an unauthorized entry has been detected.

The method may further comprise detecting, by the one or more rack processors based on the sensor signals, an authorized entry to the server rack, wherein the security status indicates that an authorized entry has been detected.

The method may further comprise establishing, by the one or more rack processors, one or more connections with the server computers within the server rack; and registering, by the one or more rack processors, the server computers within the server rack, wherein the security status is periodically sent to the registered server computers over the established connections.

The method may further comprise receiving, by the one or more rack processors from the one or more server computers within the server rack, a query on the security status of the server rack, wherein the security status is sent to the one or more server computers in response to the query.

The method may further comprise providing, by the one or more rack processors, a set of policies to the one or more server computers within the server rack, wherein the set of policies include one or more actions to be taken depending on the security status of the server rack. The set of policies may include at least one of: start running one or more sensitive cloud services, stop running one or more sensitive cloud services, deleting keys associated with one or more sensitive cloud services, wiping data associated with one or more sensitive cloud services, re-routing data associated with one or more sensitive cloud services to another server computer in a different server rack or datacenter, stop running one or more sensitive services in the server rack and restart running the one or more services in a different server rack.

The present disclosure further provides for establishing, by a server computer within a server rack, a connection with one or more rack processors of the server rack before starting to run one or more sensitive cloud services; receiving, by the server computer from the one or more rack processors, a security status of the server rack over the established connection, the security status indicating a physical state of the server rack; determining, by the server computer based on the security status of the server rack, one or more actions to be taken with respect to the one or more sensitive cloud services; and executing, by the server computer, the one or more actions for the one or more sensitive cloud services.

The one or more actions may include at least one of: start running the one or more sensitive cloud services, stop running the one or more sensitive cloud services, deleting keys associated with the one or more sensitive cloud services, wiping data associated with the one or more sensitive cloud services.

The method may further comprise sending, by the server computer to the one or more rack processors, a query on the security status of the server rack, wherein the security status is received from the one or more rack processors in response to the query.

The method may further comprise accessing, by the server computer, a set of policies specifying actions to be taken for a plurality of sensitive cloud services depending on the security status of the server rack, wherein the one or more actions to be taken are determined by the server computer based on the set of policies.

The present disclosure still further provides for a system comprising a server rack in a datacenter. The server rack includes one or more rack processors configured to: receive sensor signals from one or more sensors of the server rack, the sensor signals capturing a physical environment of the server rack; determine, based on the sensor signals, a security status of the server rack; and send the security status to one or more cloud services on one or more server computers within the server rack.

Capturing the physical environment may include detecting at least one of: positioning of a door or other components of the server rack, contacts made with any part of the server rack, damages to the server rack, motions of objects or persons inside the server rack.

The system may further comprise the one or more sensors, wherein the one or more sensors include at least one of: motion sensors, optical sensors, capacitive sensors, vibration sensors, pressure sensors, contact sensors.

The one or more rack processors may be further configured to receive maintenance information for the server rack, wherein the security status is further determined based on the maintenance information.

The system may further comprise the one or more server computers in the server rack, wherein the one or more server computers are configured to: establish a connection with the one or more rack processors before starting to run one or more sensitive cloud services; receive, from the one or more rack processors, the security status of the server rack over the established connection; determine, based on the security status of the server rack, one or more actions to be taken with respect to the one or more sensitive cloud services; and execute the one or more actions for the one or more sensitive cloud services. The one or more actions include at least one of: start running the one or more sensitive cloud services, stop running the one or more sensitive cloud services, deleting keys associated with the one or more sensitive cloud services, wiping data associated with the one or more sensitive cloud services, re-routing data associated with the one or more sensitive cloud services to another server computer in a different server rack or datacenter, stop running one or more sensitive services in the server rack and restart running the one or more services in a different server rack.

BRIEF DESCRIPTION OF THE DRAWINGS

FIG. 3 is a table showing example inputs and outputs of an Ethernet door module in accordance with aspects of the disclosure.

DETAILED DESCRIPTION

The technology generally relates to a secure server rack in a datacenter. To address the issues mentioned above, a system including one or more rack processors may be configured to keep the server computers within a server rack informed of the security status of the server rack. In this regard, sensor signals from one or more sensors of the server rack may be received. The sensor signals may capture a physical environment of the server rack, such as positioning of a door or other components of the server rack, contacts made with any part of the server rack, tampering with the server rack, motions of objects or persons inside the server rack, etc. Based on the sensor signals, a security status of the server rack may be determined. The security status may then be sent to cloud services running on the server computers within the server rack, so that the server computers and/or the services running on the server computers may take appropriate action.

Figure 1A:
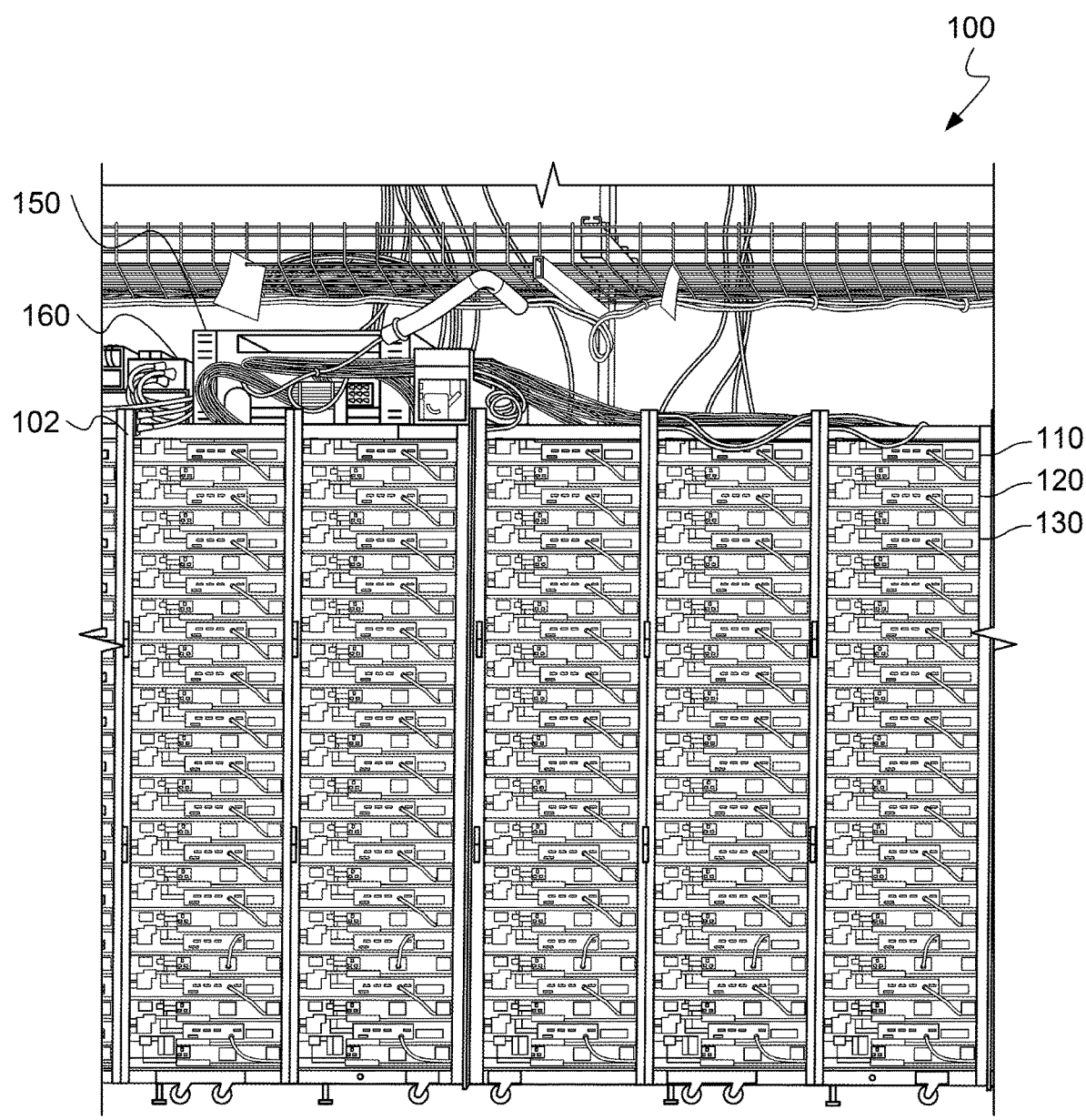
FIGS. 1A and B are pictorial diagrams illustrating an example server rack in accordance with aspects of the disclosure.
Figure 1B:
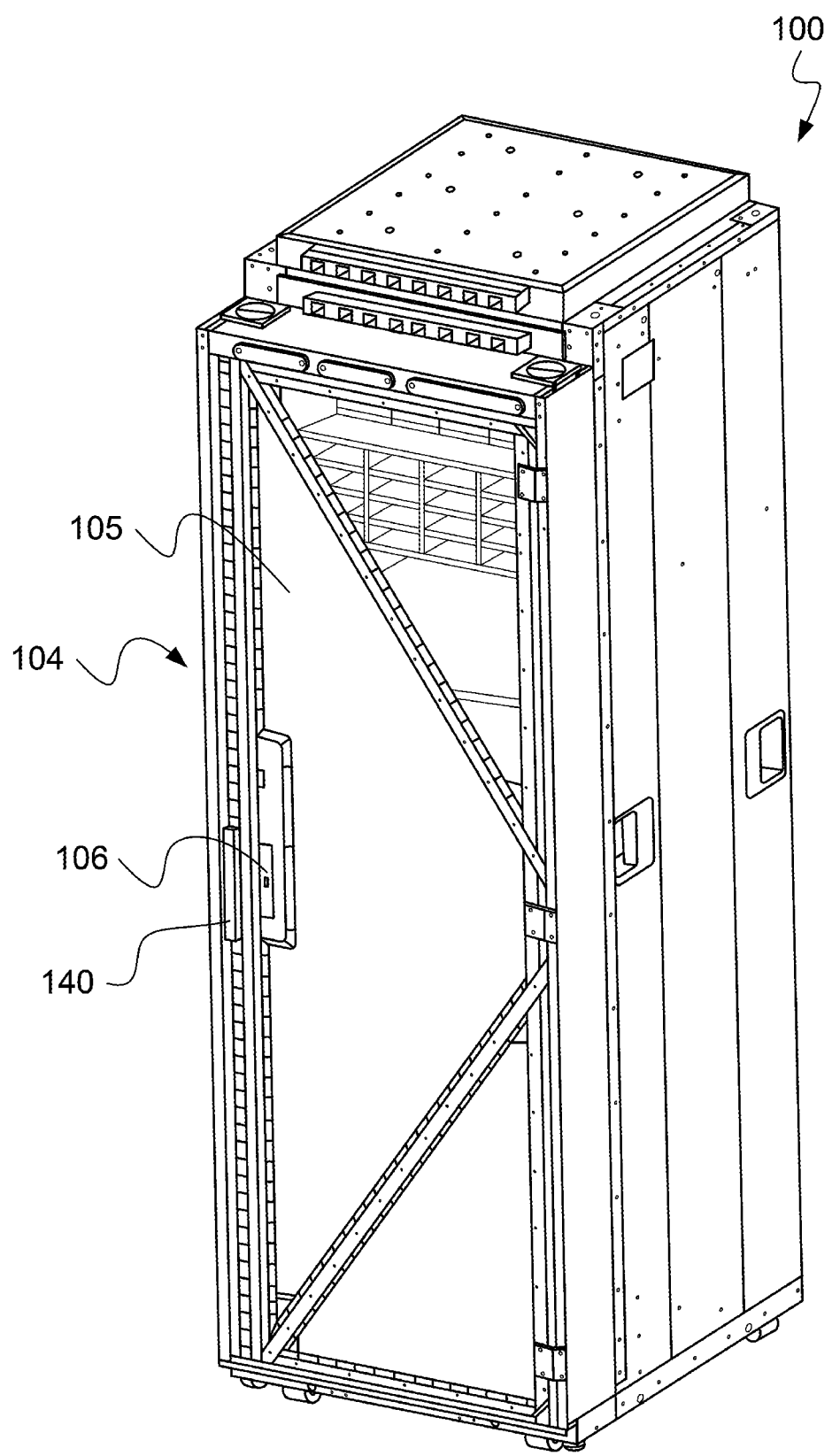

FIGS. 1A and 1B show an example server rack 100. FIG. 1A shows the server rack 100 with an open door, exposing the server computers therein, while FIG. 1B shows the server rack 100 with a closed door. A datacenter may include many server racks configured similarly or differently as the example server rack 100. Although only one server rack 100 is shown, and only a few server computers are shown within the server rack 100, in practical examples the system may include any of a number server racks, each of which may include any of a number of server computers.

Referring to FIG. 1A, the server rack 100 may include one or more server computers, such as server computer 110, server computer 120, and server computer 130. The server computers 110, 120, 130 may be arranged inside an enclosure, which may be the server rack 100 itself as shown, or may be a separate structure. The enclosure may include a frame 102, such as a shelf structure for supporting the server computers inside. Referring to FIG. 1B, the enclosure may further include one or more doors 104 that allow access to the server computers, and one or more locks 106 to secure the doors. The locks 106 may include a mechanical lock requiring a mechanical key, and/or may include an electronic lock that can be opened with the correct pin codes, badges with barcodes or RFID, biometrics such as fingerprints, or other authentication credentials or mechanisms. In some instances, the doors 104 may include a mesh screen 105 for protection against tampering.

The server rack 100 may be provided with one or more sensors 140. The sensors 140 may be positioned anywhere on or in the enclosure, such as on the frame 102, on or near the doors 104, on or near the mesh screens 105, on or near the locks 106. Additionally or alternatively, the sensors 140 may be positioned on the server computers 110, 120, 130 themselves. The sensors 140 may include motion sensors, contact sensors, optical sensors, capacitive sensors, vibration sensors, pressure sensors, etc. The sensors 140 may capture the physical environment or state of the server rack 100, which may include positioning of a door or other components of the server rack 100 (e.g., open or closed), contacts made with any part of the server rack 100, tampering with the server rack 100 (e.g., with doors or locks), motions of objects or persons inside the server rack 100, etc. As an example, motion or optical sensors on or near the doors 104 may generate signals when the doors 104 are moved, which may indicate whether the doors 104 are open or closed. As another example, where the lock 106 is electronic, an electronic reader may generate signals based on the access code provided, which may indicate whether an entry is properly authenticated. As still another example, the mesh screen 105 may include capacitive sensors that generate sensor signals based on the force applied to the mesh screen 105, which may indicate whether contacts and/or damage is made to the mesh screen 105. Further, motion and/or touch sensors on the frame 102 and/or the server computers 110, 120, 130 may indicate whether contact is being made with the server computers 110, 120, 130.

As shown in FIG. 1A, the server rack 100 may be provided with one or more rack computing devices 150. As described below, the one or more rack computing devices 150 may include one or more rack processors for receiving the sensor signals from the sensors 140, analyzing the sensor signals to determine a security status of the server rack 100, and/or sending the security status to the server computers in the server rack 100. In this regard, the rack computing devices 150 may be in communication with the sensors, and also in communication with the server computers 110, 120, 130 of the server rack 100.

Optionally, the server rack 100 may be further provided with an Ethernet door module 160. The Ethernet door module 160 may be configured to receive the sensor signals from the sensors 140 and send the sensor signals to one or more security computing devices used by security personnel of the datacenter. The security personnel may use the security computing devices to process, analyze, and/or view the sensor signals from the sensors 140, and determine whether there is a security breach. Further, the Ethernet door module 160 may control one or more devices, such as alarms, lights, buzzers, based on sensor signals from the sensors 140. As such, security personnel may be alerted by the alarms, lights, buzzers, and take appropriate actions. Additionally or alternatively, the Ethernet door module 160 may also control door locks 106 and/or power switches for the server rack 100 based on the sensor signals from the sensors 140. For instance, locks 106 may be turned on and power may be switched off when sensor signals indicate that an intruder is attempting to cut the mesh screen 105 and break into the server rack 100.

Figure 2:
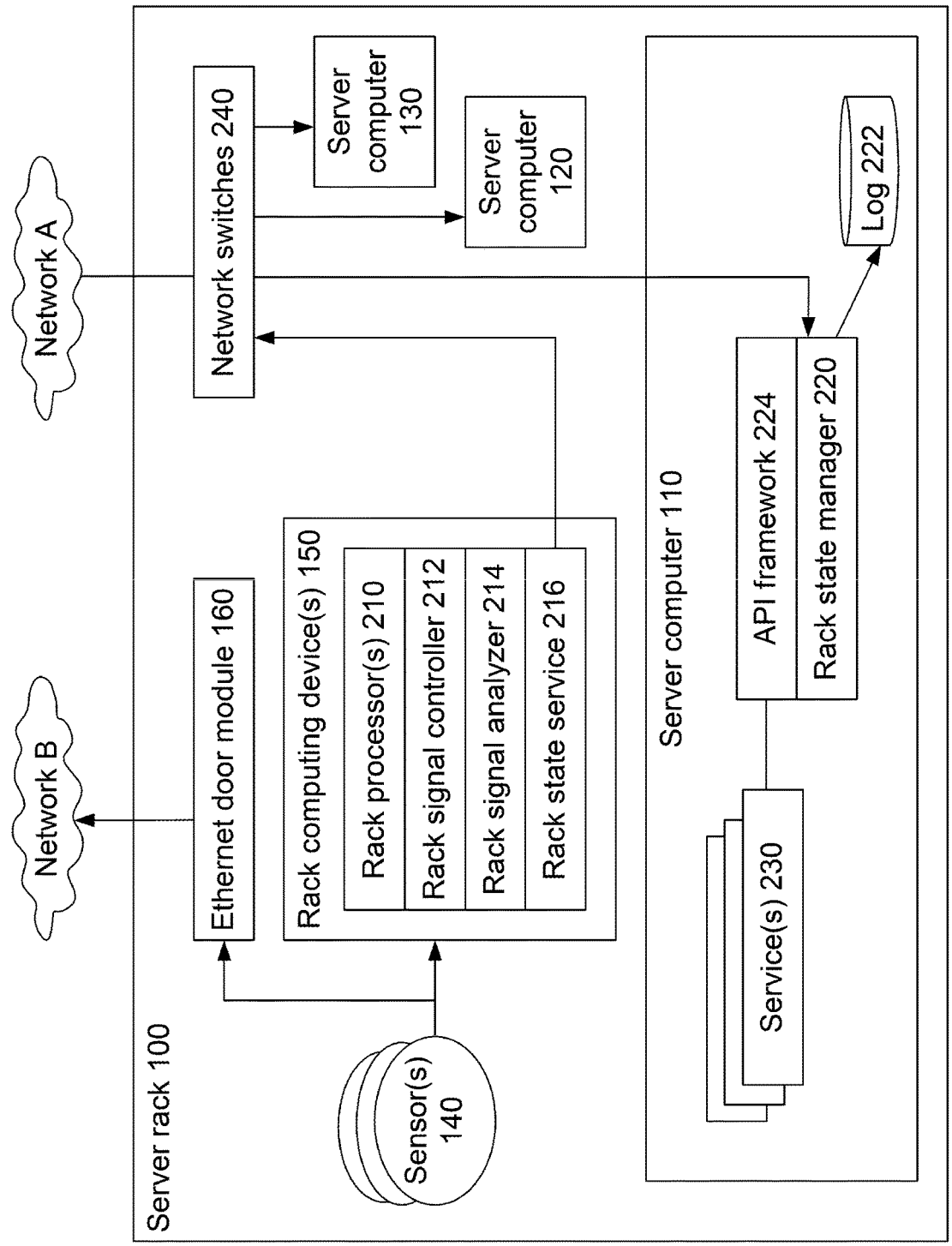
FIG. 2 is a block diagram showing an example system for providing security status information of a server rack in accordance with aspects of the disclosure.

FIG. 2 is a block diagram of an example system including the server rack 100. The server rack 100 is shown with the server computers 110, 120, 130, the one or more sensors 140, the one or more rack computing devices 150, and the Ethernet door module 160. Although only one server rack 100 is shown, and only a few server computers are shown within the server rack 100, in practical examples the system may include any of a number of server racks, each of which may include any of a number of server computers.

The rack computing devices 150 contain one or more rack processors 210, memory, and other components typically present in general purpose computing devices. The one or more rack processors 210 can be dedicated components such as an application specific integrated circuit ("ASIC"), which may be customized or off-the-shelf, or any other conventional processors, such as commercially available microprocessors, CPUs, etc. Although not necessary, one or more of the rack processors 210 may include specialized hardware components to perform specific computing processes.

Memory of the rack computing devices 150 can be of any non-transitory type capable of storing information accessible by the processor, such as a hard-drive, memory card, ROM, RAM, DVD, CD-ROM, write-capable, and read-only memories. Memory of the rack computing devices 150 can store information accessible by the rack processors 210, including data and instructions. For instance, memory of the rack computing devices 150 can store instructions that can be executed by the rack processors 210. The memory of the rack computing devices 150 can also include data that can be retrieved, manipulated, and/or stored by the rack processors 210. For instance, sensor signals received from sensors 140 may be stored as data, which may be processed and/or analyzed by the rack processors 210 according to the instructions.

The instructions can be any set of instructions to be executed directly, such as machine code, or indirectly, such as scripts, by one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance.

The data can have any of a number of structures. For example, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

Although not shown, rack computing devices 150 may optionally include other components typically present in general purpose computer devices. For example, the rack computing devices 150 may include output devices, such as displays, speakers, haptics, etc. The rack computing devices 150 may also include user input devices, such as a mouse, keyboard, touch-screen, microphones, sensors, etc.

Each of the server computers 110, 120, 130 may contain one or more processors, memories, and other components typically present in general purpose computing devices as described above. The server computers 110, 120, 130 may provide any of a variety of services 230, such as storage, authentication, messaging, hosting, etc. For instance, the server computers 110, 120, 130 may be part of a cloud computing system in a datacenter or datacenter type location. As such, the server computers 110, 120, 130 may each be configured to provide one or more cloud services. Examples of cloud services may include storing shards or replicas of data for a cloud database, running workloads for one or more applications, hosting virtual machines or hypervisors, etc.

The rack computing devices 150 and the server computers 110, 120, 130 can be different nodes of a network, such as network A shown, and capable of directly and indirectly communicating with other nodes of network A. Other server computers in the datacenter, including those in other server racks, may also be connected to network A. For instance, all the server computers in the datacenter providing service for the cloud, or one or more subsets of server computers, such as clusters, may be connected to network A. The network A and intervening nodes described herein can be interconnected using various protocols and systems, such that the network can be part of the Internet, World Wide Web, specific intranets, wide area networks, or local networks. The network can utilize standard communication protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Although the server computers 110, 120, 130 may each comprise a full-sized computing device, they may alternatively comprise mobile computing devices capable of wirelessly exchanging data over a network. By way of example only, instead of a rack of server computers, the rack 100 may include a number of client computing devices capable of obtaining information via the Internet. For example, the rack 100 may include a plurality of mobile phones being tested for running one or more user applications.

Although not shown, the system may further include one or more storage systems, which can be of any type of computerized storage capable of storing information accessible by one or more of the computing devices 150, 110, 120, 130, such as a hard-drive, memory card, ROM, RAM, DVD, CD-ROM, write-capable, and read-only memories. In addition, the storage system may include a distributed storage system where data is stored on a plurality of different storage devices which may be physically located at the same or different geographic locations. The storage system may be connected to various computing devices via a network, and/or may be directly connected to any of the computing devices 150, 110, 120, 130.

The computing devices 150, 110, 120, 130, and their respective processors, memories, and other elements may each comprise multiple processors, computers, computing devices, or memories that may or may not be stored within the same physical housing. For example, the memory of computing devices 150 can be a hard drive or other storage media located in housings different from that of the computing devices 150. Accordingly, references to a processor, computer, computing device, or memory will be understood to include references to a collection of processors, computers, computing devices, or memories that may or may not operate in parallel. For example, the computing devices 150 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The rack processors 210 may include one or more input ports configured to receive sensor signals from the sensors 140. For instance, the sensors 140 may be electrically connected to the rack processors 210, such as through cables, wires, contacts, traces, bus, etc. To collect and/or store the sensor signals, the rack processors 210 may be configured to run one or more software processes, such as a rack signal controller 212 shown. For example, the rack signal controller 212 may be configured to operate with low level operating system APIs and/or drivers of the sensors 140.

The rack processors 210 may be configured to process and analyze the sensor signals received from the sensors 140 in order to determine the security status of the server rack 100. For instance, the rack processors 210 may run one or more software processes, such as a rack signal analyzer 214 shown. The rack signal analyzer 214 may include instructions on how to process the sensor signals collected. Any of a number of signal processing techniques may be used, such as filtering, transformations, etc. The rack signal analyzer 214 may include instructions on how to determine security status based on the sensor signals.

For instance, the rack signal analyzer 214 may include a predetermined set of security statuses defined by one or more sensor states. As an example situation, using the rack signal analyzer 214, the rack processors 210 may analyze the sensor signals, and determine that the sensor states correspond to the doors 104 being closed, and no contact or tampering is being made with the lock 106 or the mesh screen 105. As such, the rack processors 210 may determine that the security status of the server rack 100 corresponds to a predetermined low risk level. In another situation, the rack processors 210 may analyze the sensor signals, and determine that the sensor states correspond to the locks 106 being opened by the correct key or authentication credentials, and determine that the sensor states correspond to a predetermined moderate risk level for the server rack 100. In still another situation, the rack processors 210 may analyze the sensor signals, and determine that the sensor states correspond to incorrect authentication credentials being provided to the locks 106, and/or force being applied to the doors 104 or the mesh screen 105. The rack processors 210 may then determine that the sensor states correspond to a predetermined high risk level for the server rack 100.

Optionally, the rack processors 210 may be further configured to determine the security status of the server rack 100 based on maintenance information. In this regard, the rack processors 210 may be configured to receive the maintenance information. For example, the maintenance information may be received from a maintenance ticketing system. The maintenance information may include maintenance requests, scheduled times for maintenance, authorized personnel to perform the maintenance, identity of the server computer to be serviced within the server rack, etc. As an example, the rack processors 210 may receive a maintenance request specifying that a server within server rack 100 is to be serviced at a scheduled time.

In some instances, the rack processors 210 may be configured to use the maintenance information to determine timing for a security status of the server rack 100. For example, if the scheduled maintenance time is within a threshold time period, the rack processors 210 may determine that the security status for the server rack 100 is a short-term risk. If the scheduled time is outside the threshold time period, the rack processors 210 may determine that the security status for the server rack 100 is a long-term risk. Using such timing information, the rack processors 210 may be further configured to predict a security status in the future. For example, based on a maintenance scheduled for 9 am-10 am on a next day, for the server rack 100, the rack processors 210 may determine that the security status of the server rack 100 from 9 am-10 am on the next day will be at the predetermined moderate risk level. Such prediction may enable the rack processors 210 and the server computers 110, 120, 130 within the server rack 100 to make advance preparation for the scheduled event. The advance preparation may be any of a number of actions including those described below, such as moving sensitive cloud services and/or data to server computers in other racks not scheduled for maintenance.

Additionally or alternatively, the rack processors 210 may be configured to use the maintenance information to determine whether an entry is authorized or unauthorized. For instance, if the rack processors 210 determine based on the sensor signals that the door 104 is being opened, but there is no scheduled maintenance at the time, the rack processors 210 may determine that an unauthorized entry has been made. Conversely, if the rack processors 210 determine based on the sensor signals that the door 104 is being opened, and that there is scheduled maintenance at the time, the rack processors 210 may determine that the entry is authorized.

The rack processors 210 may be configured to generate notifications or alerts based on the security statuses. In this regard, the rack signal analyzer 214 may also include instructions on whether notifications or alerts, if any, is to be generated. For example, a notification or alert may include the security status, such as a high risk level, and/or may include the underlying event corresponding to the security status, such as unauthorized entry. The rack processors 210 may be configured to store the security statuses and/or events in a persistent storage, such as a database hosted by the cloud, according to instructions included in the rack signal analyzer 214.

The rack processors 210 may be configured to send the notifications or alerts to the server computers 110, 120, 130 within the server rack 100. In this regard, the rack processors 210 may establish connections with the server computers 110, 120, 130 with the server rack 100. Hardware interface, such as wires or bus connection, may directly connect the rack processors and the server computers. As shown in FIG. 2, the rack processors 210 may be connected to the server computers 110, 120, 130 in network A through network switches 240. Further as shown in FIG. 2, the rack processors 210 may run a rack state service 216 that sends messages including the security statuses and/or the underlying events. For example, the rack state service 216 may provide remote procedure call (RPC) service APIs for sending such messages. It may be noted that, because the messages sent from the rack processors 210 to the server computers 110, 120, 130 do not leave the server rack 100, tampering with the messages may be prevented.

The rack processors 210 may register one or more of the server computers 110, 120, 130 within the server rack 100. As such, the rack processors 210 may periodically send security status of the server rack 100 to each of the registered server computers over the established connections. Alternatively or additionally, the rack processors 210 may receive queries from one or more of the server computers 110, 120, 130 within the server rack 100, and may then send the security status to the server computers 110, 120, 130 in response to the queries.

The rack processors 210 may additionally or alternatively register one or more services, such as cloud services, running on the server computers 110, 120, 130. For instance, server computer 110 may register one or more of the services 230 with the rack processors 210. Some of the services 230 may contain sensitive information, such as encryption keys used to protect user account information. For example, a health tracker application may store and/or process users' biometric data. As another example, a database for a financial institution may store records of financial transactions. As still another example, a virtual machine may access file systems including photos and/or messages. When the encryption keys are stolen or compromised, the protection they provide to other types of data becomes ineffective. The rack processors 210 may then ensure that at least the server computers running sensitive cloud services, such as the server computer 110, are periodically receiving the security status of the server rack 100.

The server computers 110, 120, 130 within the server rack 100 may be configured to receive the messages sent by the rack processors 210, which as described above may include notifications or alerts of the security statuses and/or underlying events. For example, the messages may be received through the network switches 240. Further, processors of server computer 110 may be configured to run a software process, such as a rack state manager 220, for receiving the messages from the server rack 100. The rack state manager 220 may optionally include instructions for storing the security statuses and/or the underlying events in a log 222.

Once the security status is received by the server computer 110, the security status may be provided to the one or more services 230 running on the server computer 110. In this regard, an API framework 224 may be provided on the server computer 110. For instance, the API framework 224 may make the security status of the server rack 100 accessible to the services 230. The services 230 may have predetermined policies or rules, for example in its settings, for handling the service based on the security status of the server rack 100. As an example, a policy for one of the services 230 may be to pause the service when the security status is a moderate risk level. As another example, a policy for another one of the services 230 may be to wipe user data when the security status is a high risk level. As still another example, a policy of still another one of the services 230 may be to continue as usual regardless of the security status of the server rack 100.

Additionally or alternatively, a set of policies may be provided by an administrator of the datacenter to the server computers therein. For instance, the set of policies may be provided as a policy engine on the cloud. The policy engine may include rules to be applied by all the server computers in the datacenter, or may include subsets of rules to be applied by different clusters of computers in the datacenter. The set of policies may include one or more actions to be taken by a server computer with respect to a service depending on the security status of the server rack. In some instances, the policies may include characterization of the services, and the actions appropriate for each type of service. For example, one policy may be to run services characterized as sensitive only if the security status is low risk. Another example policy may be to stop running the services characterized as sensitive if the security status is moderate risk. Other example policies may include deleting electronic keys and/or wiping data associated with the services characterized as sensitive when the security status is high risk. Still other example policies may include pausing services characterized as sensitive, hiding the electronic keys associated with such services, and/or re-routing data associated with such services to other server computers when the security status is moderate risk, such as during a scheduled maintenance.

In some instances, the server computers 110, 120, 130 in the server rack 100 may be required to establish a connection with the rack processors 210 before starting to run any sensitive services. For example, server computer 110 may determine whether a connection is established with the rack processors 210 before starting a sensitive cloud service. Once a security status from the server rack 100 over the established connection, the server computer 110 may then decide whether to start the sensitive cloud service based on the security status, for example according to the policies in the policy engine or the policies of the sensitive cloud service.

Once the appropriate actions are determined based on the security status of the server rack 100, the server computer 110 may execute the appropriate actions with respect to the services 230. For instance, the server computer 110 may start or stop running one or more of the services 230. As another example, the server computer 110 may cause one or more of the services 230 to wipe data or delete electronic keys. As still another example, the server computer 110 may reroute data for one or more of the services 230 to another server computer in a different server rack or even a different datacenter. The server computer 110 may also stop running the services 230, and restart the services 230 on another server computer in another server rack.

To ensure a faster response time than, for example, a security personnel, the system may be configured to meet a maximum detection time threshold. As an example, a target latency between a security status change for the server rack 100 and notification to the services running on the server computers 110, 120, 130 within the server rack 100 may be set as within five seconds. The system may then be designed to meet the target latency. For example, the rack processors 210 may be configured to have sampling rate of at least twice per second, which results in a latency of <0.5 s for receiving the sensor signals. The rack processors 210 may be configured with sufficient processing power to ensure a latency of <1 s when processing the sensor signals. The network switches 240 may be configured to have a latency of <1 ms. The server computers 110, 120, 130 may be configured to have a latency of <1 s for delivering the received security status to the services running on them.

As mentioned above with reference to FIG. 1A, the sensors 140 may additionally be configured to send sensor signals to one or more security computing devices (not shown) monitored by security personnel. In this regard, the Ethernet door module 160 may be configured to send the sensor signals to the security computing devices. In addition, the Ethernet door module 160 may further output control signals to one or more output devices in order to alert the security personnel. To protect the sensor signals and/or the control signals from tampering, the Ethernet door module 160 may send the sensor signals and/or the control signals through a network B, which is different from the network that connects the rack computing devices 150 to the server computers 110, 120, and 130. The Ethernet door module 160 may include any of a number of security protocols for protecting the signals.

FIG. 3 shows example inputs and outputs of the Ethernet door module 160. As shown, the sensor signals may be received as inputs to the Ethernet door module 160, which may indicate door positioning, door mesh tampering, badge reader tampering, whether lock handle is closed or released, whether electronic lock is engaged or retracted. Further as shown, the Ethernet door module 160 may generate outputs that control one or more devices, such as alarms, lights, buzzers, based on sensor signals from the sensors 140. For example, the Ethernet door module 160 may generate an output that controls the doors 104 and/or locks 106, such as closing and locking them. The Ethernet door module 160 may generate an output that turns on an LED light when the locks 106 are opened with proper authentication credentials. The Ethernet door module 160 may generate an output that turns on a buzzer when the locks 106 are provided with incorrect authentication credentials. As still another example, the Ethernet door module 160 may generate an output that turns off the power when the mesh screen 105 is being tampered with.

Figure 4:
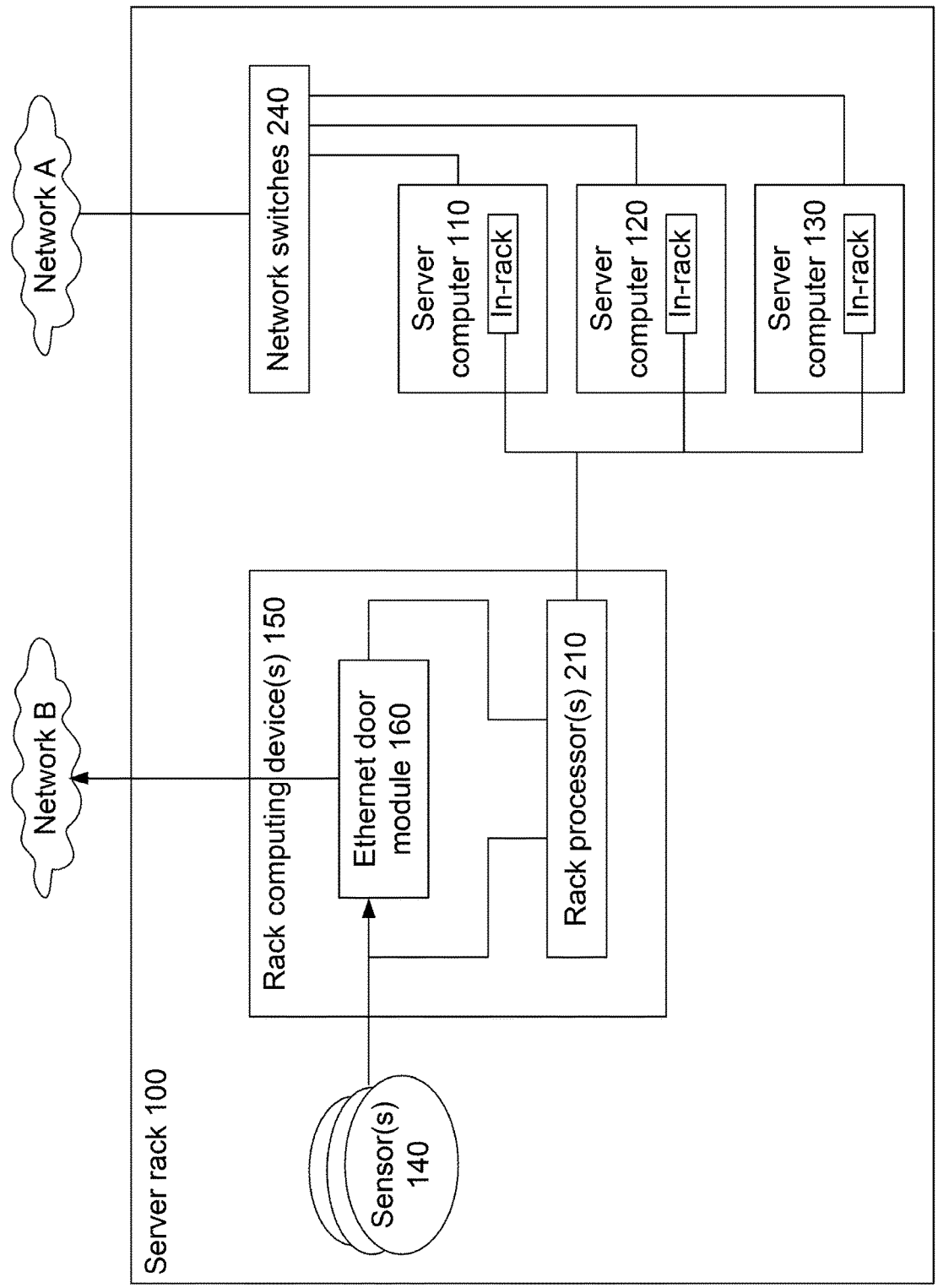
FIG. 4 is a block diagram showing another example system for providing security status information of a server rack in accordance with aspects of the disclosure.

FIG. 4 is a block diagram of another example system including the server rack 100. FIG. 4 includes many similar elements as FIG. 2, and is labeled as such. For instance, the server rack 100 is shown with the server computers 110, 120, 130, the one or more sensors 140, the one or more rack computing devices 150, and the Ethernet door module 160. Similarly as FIG. 2, the server computers 110, 120, 130 are connected to network A through network switches 240, while the Ethernet door module 160 is connected to network B.

However, in this alternative configuration, the server computers 110, 120, 130 are also each connected to an in-rack network. Unlike network A, which may further connect server computers in other server racks, the in-rack network is dedicated to the server rack 100. Further as shown, the rack processors 210 may be connected to the server computers 110, 120, 130 via the in-rack network. In some instances no new hardware and/or cabling may be needed in the network for this configuration However, the configuration creates a bridge between the network A and the network B because the server computers 110, 120, 130 are connected to both network A and the in-rack network, and the rack computing devices 150 are both connected to network B (via Ethernet door module 160) and to the in-rack network (via rack processors 210). The bridge may expose both networks to vulnerabilities in either network, although the vulnerabilities may be limited since only sensor signals are passed through the bridge. Features may be provided to protect the networks against such vulnerabilities. For instance, the system may be configured such that only single-sided communication is permitted, for example from the rack processors 210 to the server computers 110, 120, 130, to prevent attack from network A to reach network B. As another example, the rack processors 210 may be configured to react according to signals received from the Ethernet door module 160 to prevent attacks from network B to network A.

Figure 5:
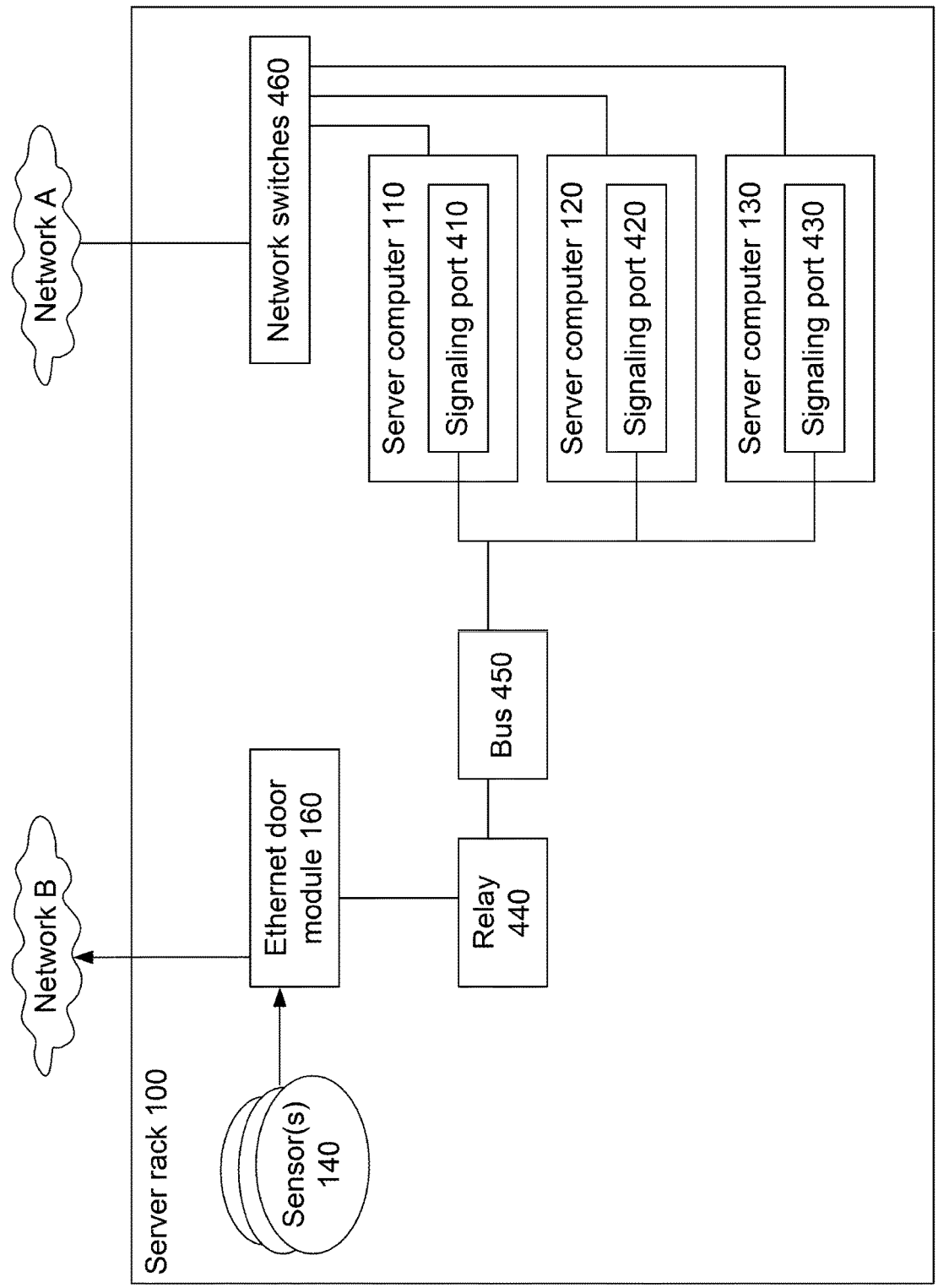
FIG. 5 is a block diagram showing another example system for providing security status information of a server rack in accordance with aspects of the disclosure.

FIG. 5 is a block diagram of another example system including the server rack 100. FIG. 5 includes many similar elements as FIG. 2, and is labeled as such. For instance, the server rack 100 is shown with the server computers 110, 120, 130, the one or more sensors 140, the one or more rack computing devices 150, and the Ethernet door module 160.

However, in this alternative configuration, the sensor signals are received by the Ethernet door module 160, and sent through a relay 440, through a bus connection 450 to respective signaling ports 410, 420, 430 on each of the server computers 110, 120, 130. Processors of each server computer 110, 120, 130 may then process and analyze the received sensor signals in order to determine the security status of the server rack 100. The relay 440 may be any of a number types of relay, such as a Form C relay. The signaling ports 410, 420, 430 may be any of a number of types, such as peripheral component interconnect express (PCIe). The signaling ports 410, 420, 430 may be configured to receive an external signal, such as from the bus 450, and based on the external signal, the signaling ports 410, 420, 430 may be configured to self-destruct the data they store. The configuration simplifies the paths for transmitting the sensor signals. However, additional drivers may be needed on the server computers 110, 120, 130 for the signaling ports.

Figure 6:
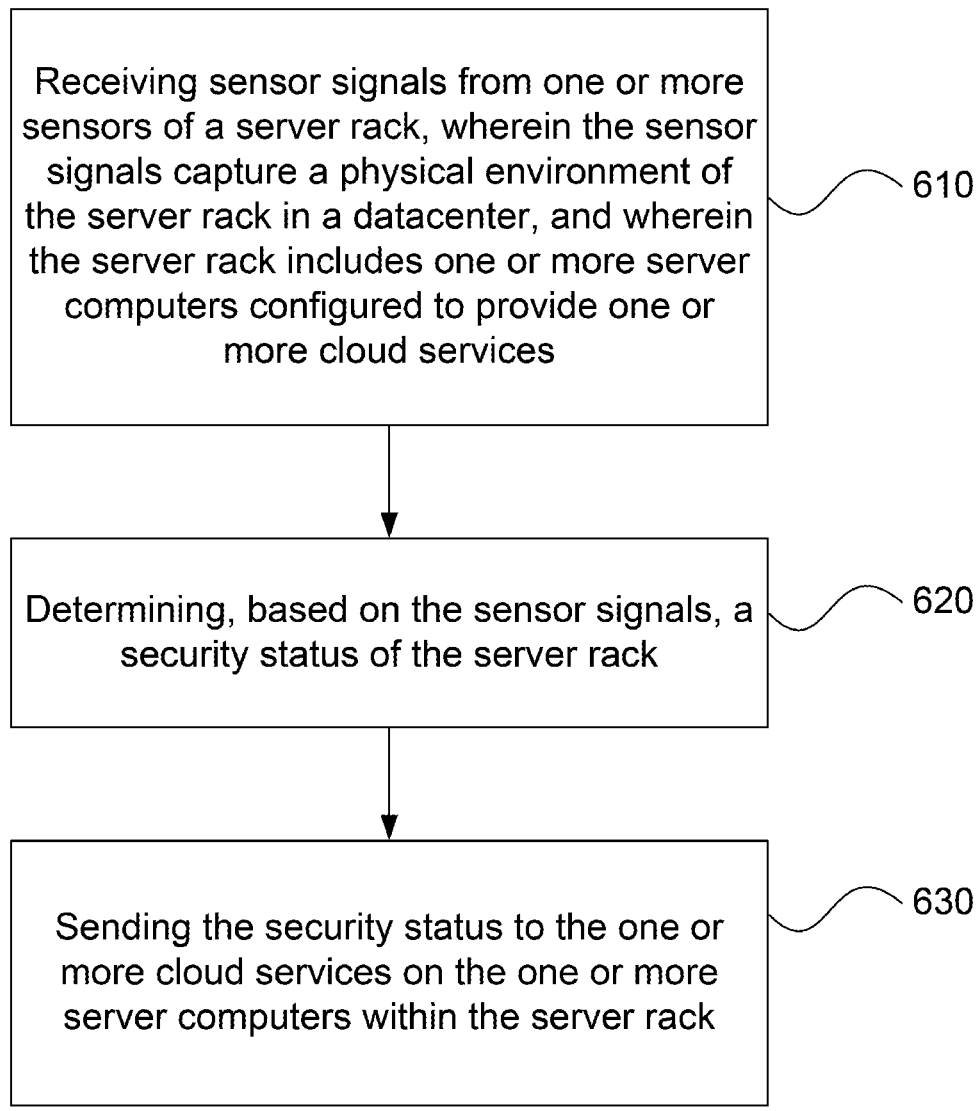
FIG. 6 is a flow diagram showing an example method of providing security status information of a server rack in accordance with aspects of the disclosure.

FIG. 6 shows an example flow diagram 600 illustrating an example method in accordance with aspects of the disclosure. The method may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted. Although FIG. 6 illustrates one example method, variations of the methods may be performed, for instance as described above with reference to FIGS. 2-5. The flow diagram 600 may be performed by one or more rack processors, such as by rack processors 210 of FIG. 2. The rack processors 210 may receive data, and may make determinations based on the data as described above with reference to FIGS. 2-5.

Referring to FIG. 6, at block 610, sensor signals from one or more sensors of a server rack are received. As described above with respect to the example systems, the sensor signals capture a physical environment of the server rack in a datacenter, which may include positioning of doors, server computers, and other components of the server rack, tampering and damage to any parts of the server rack. The server rack includes one or more server computers configured to provide one or more cloud services. For example, the server computers may run workloads for user applications, store shards or replicas of databases, run virtual machines, etc.

At block 620, a security status of the server rack is determined based on the sensor signals. As described above with respect to the example systems, predetermined security statuses may be defined based on one or more sensor states of the one or more sensors. Further as described above, in some instances maintenance information, such as scheduled maintenance requests, may be used to predict a future security status for the server rack.

At block 630, the security status is sent to the one or more server computers within the server rack. The security status may be sent to the one or more cloud services running on the server computers. As described above with respect to the example systems, policies on appropriate actions to be taken based on the security status may be provided as a policy engine on the cloud, or may be configured as settings in the cloud services. In some instances, the security status may be sent periodically. In other instances, the security status may be sent in response to queries.

Figure 7:
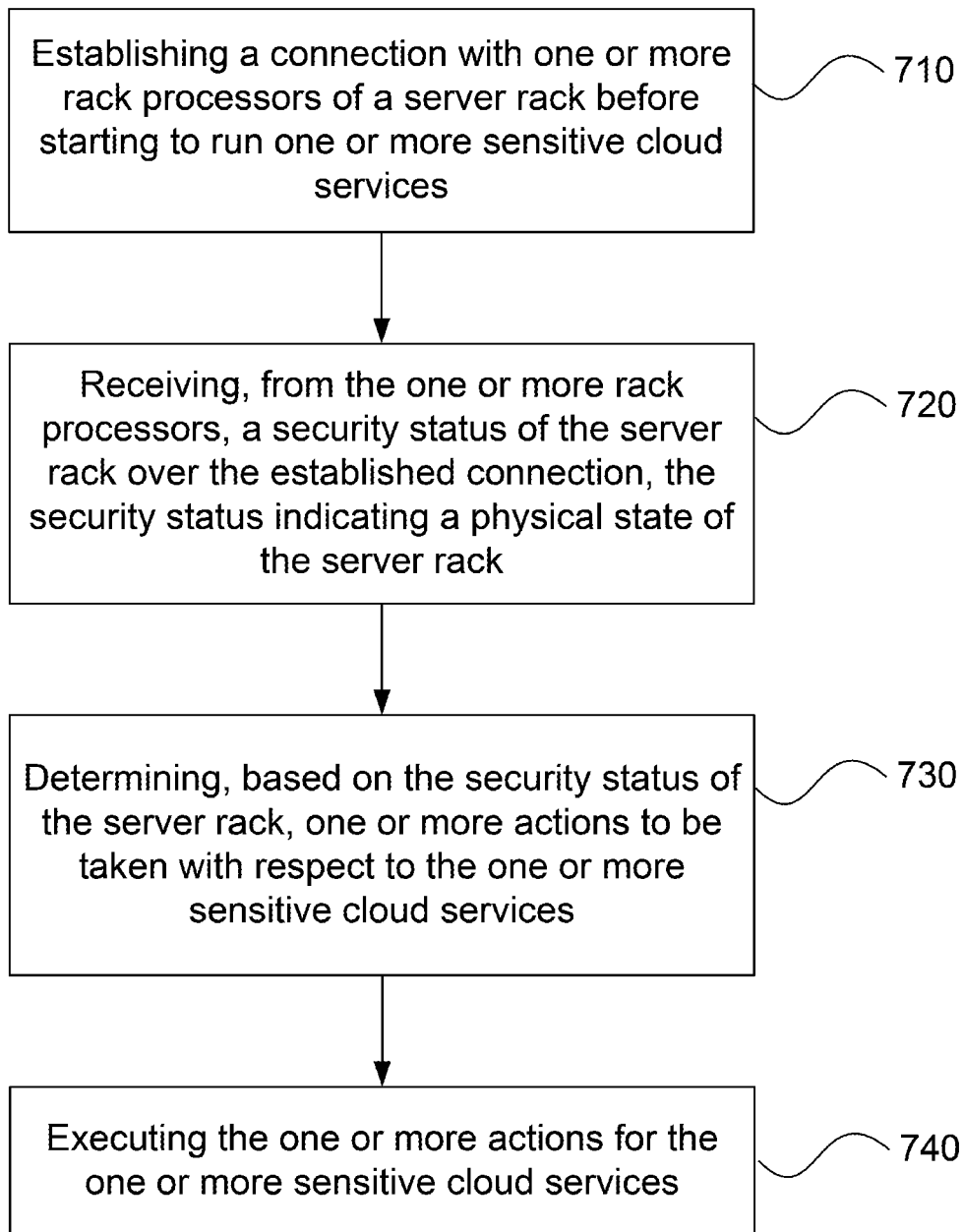
FIG. 7 is a flow diagram showing another example method of using security status information of a server rack in accordance with aspects of the disclosure.

FIG. 7 shows an example flow diagram 700 illustrating an example method in accordance with aspects of the disclosure. The method may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted. Although FIG. 7 illustrates one example method, variations of the methods may be performed, for instance as described above with reference to FIGS. 2-5. The flow diagram 700 may be performed by a server computer, such as by processors of server computer 110 of FIG. 2. The processors of the server computer 110 may receive data, and may make determinations based on the data as described above with reference to FIGS. 2-5.

Referring to FIG. 7, at block 710, a connection is established with one or more rack processors of the server rack before starting to run one or more sensitive cloud services. As described with reference to FIGS. 2, 4, and 5, server computers within a server rack may establish connections with the rack processors over a network, for example through network switches. Further as described above, examples of sensitive cloud services may include databases for a financial institution, workloads for a social media application, etc.

At block 720, a security status of the server rack is received from the one or more server processors over the established connection. For example, the security status may be received by a server computer within the rack through a network switch. The server computer may run a rack state manager for receiving the security status, and/or store the status in a log.

At block 730, one or more actions to be taken with respect to one or more sensitive applications is determined based on the security status of the server rack. For instance, the server computer may run an API framework that provides the received security status to the cloud services running on the server computer. The cloud services may include policies for appropriate actions to be taken depending on the security status of the server rack, or may refer to a policy engine provided on the cloud for the appropriate actions.

At block 740, one or more actions are executed. Once determined, the appropriate actions may be executed. For instance, the server computer may start or stop running sensitive cloud services. As another example, the server computer may cause the sensitive cloud service to wipe data or delete electronic and/or cryptographic keys.

The technology is advantageous because it enables individual server computers and applications running on them to become aware of the physical environment, and react to threats accordingly. The technology improves response time to threats by not relying on human actions. By making the individual server computers and applications aware of their surroundings, effective actions such as deleting keys and wiping data, may be executed by the server computers in addition to any action that a security personnel might take. The technology also allows the individual servers to take actions in view of planned events, such as scheduled maintenance. Further, although the system is described above with respect to server racks, the system may be extended, for example to protect racks of mobile devices being used for testing, or as additional physical protection to software enclave environments, etc.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
receiving, by one or more rack processors, sensor signals from one or more sensors of a server rack, wherein the sensor signals capture a physical environment of the server rack in a datacenter, and wherein the server rack includes one or more server computers configured to provide one or more cloud services;
determining, by the one or more rack processors based on the sensor signals, a security status of the server rack, the security status having an associated risk level of a plurality of different possible risk levels;
sending, by the one or more rack processors, the security status to the one or more cloud services on the one or more server computers within the server rack; and
providing, by the one or more rack processors, a set of policies to the one or more server computers within the server rack, wherein the set of policies includes a first policy identifying one or more first actions to be taken by a first cloud service depending on the associated risk level of the security status of the server rack and a second policy identifying one or more second actions to be taken by a second cloud service depending on the associated risk level of the security status of the server rack, the one or more first actions being different than the one or more second actions.

2. The method of claim 1, wherein capturing the physical environment includes detecting at least one of: positioning of a door or other components of the server rack, contacts made with any part of the server rack, tampering with the server rack, motions of objects or persons inside the server rack.

3. The method of claim 1, further comprising:
receiving, by the one or more rack processors, maintenance information for the server rack, wherein the security status is further determined based on the maintenance information.

4. The method of claim 3, wherein the maintenance information includes at least one of: a maintenance request, a scheduled time for maintenance, an authorized personnel to perform the maintenance, an identity of a given server computer to be serviced within the server rack.

5. The method of claim 1, further comprising:
detecting, by the one or more rack processors based on the sensor signals, an unauthorized entry to the server rack, wherein the security status indicates that an unauthorized entry has been detected.

6. The method of claim 1, further comprising:
detecting, by the one or more rack processors based on the sensor signals, an authorized entry to the server rack, wherein the security status indicates that an authorized entry has been detected.

7. The method of claim 1, further comprising:
establishing, by the one or more rack processors, one or more connections with the server computers within the server rack;
registering, by the one or more rack processors, the server computers within the server rack, wherein the security status is periodically sent to the registered server computers over the established one or more connections.

8. The method of claim 1, further comprising:
receiving, by the one or more rack processors from the one or more server computers within the server rack, a query on the security status of the server rack, wherein the security status is sent to the one or more server computers in response to the query.

9. The method of claim 1, wherein the set of policies include at least one of: start running one or more sensitive cloud services, stop running one or more sensitive cloud services, deleting keys associated with one or more sensitive cloud services, wiping data associated with one or more sensitive cloud services, re-routing data associated with one or more sensitive cloud services to another server computer in a different server rack or datacenter, stop running one or more sensitive services in the server rack and restart running the one or more services in a different server rack.

10. A method, comprising:
establishing, by a server computer within a server rack, a connection with one or more rack processors of the server rack before starting to run one or more sensitive cloud services;
receiving, by the server computer from the one or more rack processors, a security status of the server rack over the established connection, the security status indicating a physical state of the server rack, the security status having an associated risk level of a plurality of different possible risk levels;
determining, by the server computer based on the security status of the server rack and associated risk level, one or more actions to be taken with respect to the one or more sensitive cloud services based on a set of policies including a first policy identifying one or more first actions to be taken by a first cloud service depending on the associated risk level of the security status of the server rack and a second policy identifying one or more second actions to be taken by a second cloud service depending on the associated risk level of the security status of the server rack, the one or more first actions being different than the one or more second actions; and
executing, by the server computer, the one or more actions for the one or more sensitive cloud services.

11. The method of claim 10, wherein the one or more actions include at least one of: start running the one or more sensitive cloud services, stop running the one or more sensitive cloud services, deleting keys associated with the one or more sensitive cloud services, wiping data associated with the one or more sensitive cloud services.

12. The method of claim 10, further comprising:
sending, by the server computer to the one or more rack processors, a query on the security status of the server rack, wherein the security status is received from the one or more rack processors in response to the query.

13. The method of claim 10, further comprising:
accessing, by the server computer, a set of policies specifying actions to be taken for a plurality of sensitive cloud services depending on the security status of the server rack, wherein the one or more actions to be taken are determined by the server computer based on the set of policies.

14. A system, comprising:
a server rack in a datacenter, the server rack including one or more rack processors configured to:
receive sensor signals from one or more sensors of the server rack, the sensor signals capturing a physical environment of the server rack;
determine, based on the sensor signals, a security status of the server rack, the security status having an associated risk level of a plurality of different possible risk levels;
send the security status to one or more cloud services on one or more server computers within the server rack; and
provide a set of policies to the one or more server computers within the server rack, wherein the set of policies includes a first policy identifying one or more first actions to be taken by a first cloud service depending on the associated risk level of the security status of the server rack and a second policy identifying one or more second actions to be taken by a second cloud service depending on the associated risk level of the security status of the server rack, the one or more first actions being different than the one or more second actions.

15. The system of claim 14, wherein capturing the physical environment includes detecting at least one of: positioning of a door or other components of the server rack, contacts made with any part of the server rack, damages to the server rack, motions of objects or persons inside the server rack.

16. The system of claim 14, further comprising:
the one or more sensors, wherein the one or more sensors include at least one of: motion sensors, optical sensors, capacitive sensors, vibration sensors, pressure sensors, contact sensors.

17. The system of claim 14, wherein the one or more rack processors are further configured to receive maintenance information for the server rack, wherein the security status is further determined based on the maintenance information.

18. The system of claim 14, further comprising:
the one or more server computers in the server rack, wherein the one or more server computers are configured to:
- establish a connection with the one or more rack processors before starting to run one or more sensitive cloud services;
- receive, from the one or more rack processors, the security status of the server rack over the established connection;
- determine, based on the security status of the server rack, one or more actions to be taken with respect to the one or more sensitive cloud services; and
- execute the one or more actions for the one or more sensitive cloud services.

19. The system of claim 18, wherein the one or more actions include at least one of: start running the one or more sensitive cloud services, stop running the one or more sensitive cloud services, deleting keys associated with the one or more sensitive cloud services, wiping data associated with the one or more sensitive cloud services, re-routing data associated with the one or more sensitive cloud services to another server computer in a different server rack or datacenter, stop running one or more sensitive services in the server rack and restart running the one or more services in a different server rack.

* * * * *